United States Patent [19]

Nishimura

[11] Patent Number: 5,020,871
[45] Date of Patent: Jun. 4, 1991

[54] OPTICAL FIBER WIRING APPARATUS

[75] Inventor: Akira Nishimura, Yokohama, Japan

[73] Assignee: Sumitomo Electric Industries, Ltd., Osaka, Japan

[21] Appl. No.: 464,107

[22] Filed: Jan. 12, 1990

[30] Foreign Application Priority Data

Jan. 12, 1989 [JP] Japan .................................. 1-3717

[51] Int. Cl.$^5$ ............................................... G02B 6/00
[52] U.S. Cl. ................................................... 350/96.1
[58] Field of Search ............... 350/96.20, 96.21, 96.22, 350/96.1

[56] References Cited

U.S. PATENT DOCUMENTS

4,653,849 3/1987 Boirat et al. ..................... 350/96.22
4,653,850 3/1987 Boirat et al. ..................... 350/96.22

Primary Examiner—John D. Lee
Assistant Examiner—Stephen W. Barns
Attorney, Agent, or Firm—Cushman, Darby & Cushman

[57] ABSTRACT

An apparatus for coupling two optical elements comprises a plurality of optical fibers, a plurality of first substrates stacked in a first direction, and a plurality of second substrates stacked in a second direction perpendicular to the first direction. Each optical fiber is fixed to one of the first substrates and a corresponding one of the second substrates such that none of the optical fibers cross over one another.

6 Claims, 7 Drawing Sheets

FIG. 7 m POSITIONS AT
EQUAL DISTANCE d

FIG. 8 f POSITIONS AT
EQUAL DISTANCE d

FIG. 11 n POSITIONS AT EQUAL DISTANCE d

FIG. 12 n SUBSTRATES IN STACK

OPTICAL FIBER WIRING APPARATUS

BACKGROUND OF THE INVENTION

1. The Field of the Related Art

The present invention relates to an optical fiber wiring apparatus for interconnecting optical switches, optical combiners, wavelength converters and other optical elements by optical fibers to configure a high-performance optical system.

2. Background of the Prior Art

The previous efforts made for lightwave transmission on fibers have been directed to its introduction into intercity or interoffice trunks. Currently, studies are being conducted to further extend the application of fiberguide transmission to subscriber loops. Unlike repeated transmission from one point to another on intercity or interoffice trunks, the transmission in subscriber loops requires that users distributed in a plane be provided with a communications network of high serviceability and efficiency that allows for quick recovery from failures, that is capable of fast response to regional variations in demand, and that has a high capacity factor. In order to configure such a flexible network, it is important to develop an optical crossconnect and a remote optical switch unit that carries optical signals and is capable of changing paths or lines. Previously, it has been difficult to realize a system that is small in size and is capable of multiple inputs and producing multiple outputs. The only product available today is an experimental version capable of eight inputs and eight outputs. One way the problem has previously been solved is to interconnect, in parallel multiple stages, a plurality of optical switches. The optical elements generally used for this purpose are not limited to optical switches alone. Optical combiners, wavelength converters, light sources, etc. are also connected in multiple stages to realize an optical crossconnect or switches of high performance. This is also the case for optical computers.

There are two approaches for interconnecting optical elements in multiple stages. One approach involves the use of optical wave-guides and the other uses optical fibers.

Optical wave-guides suffer significant insertion and transmission losses and no reliable technique for mounting optical elements on substrates has been established. Further, optical elements on substrates has been making thin substrates suitable for optical wave-guides and packing optical elements at high density is not as easy as in electrical substrates.

The second approach uses two basic methods. One is to connect the end of an optical element directly to the end of another optical element and the other is to wire optical elements with optical fibers fixed on a substrate as in the case of wiring electric circuits. These methods have a problem of increased equipment size, but compared to the first approach, are more practical since splicing and other connecting techniques are known. However, these two methods have had the following problems. In the first method, which connects the end of one optical element directly to the end of another element, optical fibers become cluttered as the number of interconnected elements increases. This cluttering causes either a significant drop in the efficiency of wiring operations or an increase in the number of wiring errors. Further, unfixed optical fibers will bend sharply at crossovers, leading to increased losses or lower strength. The problems of fiber cluttering and bending can be avoided in the second method, which wires optical elements with optical fibers fixed on the substrate. However, if a plurality of substrates are used to avoid crossing of optical fibers, interconnecting the substrates is not easy, compared with wiring electric circuits.

SUMMARY OF THE INVENTION

It is therefore an object of the present invention to provide an apparatus for wiring optical fibers on substrates that ensures wiring operation of high efficiency without causing sharp bends in optical fibers or crossing of one fiber over another.

The above-stated object of the present invention can be attained by either one of the following two approaches.

The first approach satisfies the following conditions:

[1] $S_A(h_1) \cap S_A(h_2) = \phi (h_1 \neq h_2)$, $A = S_A(f) \cup S_A(2) \cup \ldots \cup S_A(f)$ $S_B(k_1) \cap S_B(k_2) = \phi (k_1 \neq k_2)$, $B = S_B(1) \cup S_B(2) \cup \cdots \cup S_B(m)$, where A has $f$ subsets $S_A(h)$ ($h = 1, \ldots, f$) and comprises a set of terminals $a_i$ ($i = 1, \ldots, n$) of one of any two optical elements to be connected by optical fibers, B has m subsets $S_B(k)$ ($k = 1, \ldots, m$) and comprises a set of terminals $b_j$ ($j = 1, \ldots, n$) of the other optical element. Terminals $a_i$ and $b_j$ are connected in a one-to-one relationship, with the number of elements in each of $S_A(h)$ and $S_B(k)$ being at least two;

[2] $h_1$ is always smaller than $h_2$, if $a_s$ and $a_t$ correspond respectively to $\exists b_s$, $\exists b_t \in S_B(k)$ ($s' < t'$) and $a_s \in S_A(h_1)$ and $a_t \in S_A(h_2)$; and

[3] $k_1$ is always smaller than $k_2$, if $b_s$ and $b_t$ correspond respectively to $\exists a_s$, $\exists a_t \in S_A(b)$ ($s < t$) and $b_s \in S_B(k_1)$ and $b_t \in S_B(k_2)$.

The second approach has the following condition:
$S_A(h_1) \cap S_A(h_2) = \phi (h_1 \neq h_2)$, $A = S_A(1) \cup S_A(2) \cup \cdots \cup S_A(n)$ $S_A(k_1) \cap S_B(k_2) = \phi (k_1 \neq k_2)$, $B = S_B(1) \cup S_B(2) \cup \cdots \cup S_B(n)$ where A has n subsets $S_A(h)$ ($h = 1, \ldots, n$) and comprises a set of terminals $a_i$ ($i = 1, \ldots, n$) of one of any two optical elements to be connected by optical fibers, B has n subsets $S_B(k)$ ($k = 1, \ldots, n$) and comprises a set of terminals $b_j$ ($j = 1, \ldots, n$) of the other optical element, and terminals $a_i$ and $b_j$, each being connected to one optical fiber, are connected in a one-to-one relationship. However, unlike the first approach, each of subsets $S_A(h)$ and $S_B(k)$ consist of only one element.

For both approaches outlined above, substrates are provided for each subset $S_A(h)$ and $S_B(k)$. The substrates have smoothly curving grooves or channels formed thereon to which optical fibers may be fixed. A plurality of substrates for $S_A(h)$ are superposed one on top of another at equal distances to fabricate a stack of substrates for $S_A(h)$, and a plurality of substrates for $S_B(k)$ are superposed one on top of another in a direction perpendicular to the stacking direction of substrates for $S_A(h)$ at equal distances to fabricate a stack of substrates for $S_B(k)$. The two stacks are positioned adjacently, end-to-end, and are separated by a fixed distance.

BRIEF DESCRIPTION OF THE DRAWINGS

These and other advantages will become more apparent from the detailed description of the preferred embodiment along with the following drawings.

DETAILED DESCRIPTION OF THE PREFERRED EMBODIMENT

1. General Description

Figure 6:
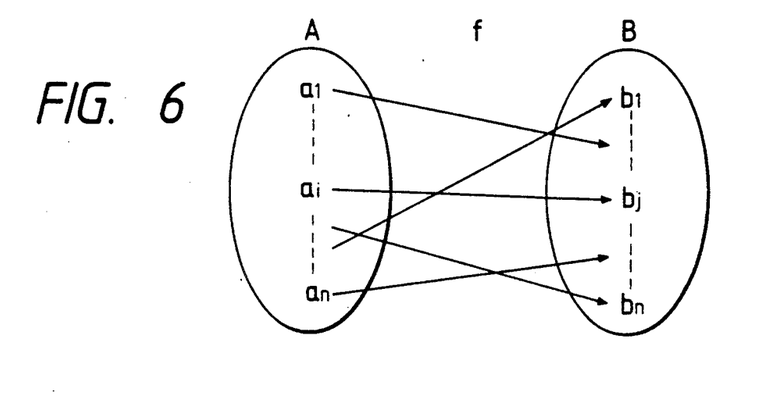
FIG. 6 is an illustration of mapping.

In the present invention, the terminals $a_i (i=1, \ldots, n)$ of one of any two optical elements to be connected by optical fibers are connected to the terminals $b_j (j=1, \ldots, n)$ of the other optical element. As shown in FIG. 6, the terminals to be connected provide one-to-one mapping (f: $a_i \rightarrow b_j$) and inverse mapping ($f^{-1}: b_j \rightarrow a_i$).

Figure 7:
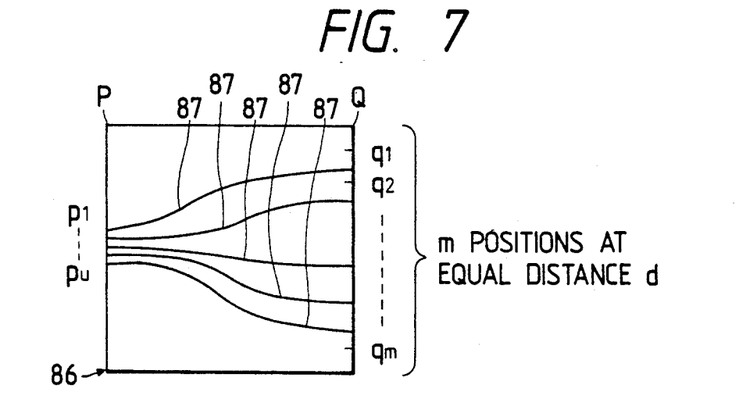
FIG. 7 is a diagram showing the pattern of grooves formed on a substrate for $S_A(h)$.

As shown in FIG. 7, a substrate 86 for the subset $S_A(h)$ of terminals $a_i$ is provided with positions $p_1, \ldots p_u$ on side P. The number of positions is equal to the number of elements in subset $S_A(h)$. Substrate 86 also has positions $q_1, \ldots q_m$ on the opposite side Q which are spaced at equal distances d and which are equal in number to subsets $S_B(k)$. Between positions $p_1, \ldots p_u$ and corresponding positions $q_1, \ldots q_m$, grooves or channels 87 span substrate 86. These channels fix optical fibers positioned in a manner that describes smooth curves. Positions $p_1, \ldots, p_u$ correspond to terminals $a_i$ in the increasing order of i, with position $p_i$ corresponding to terminal $a_i$. Accordingly, none of the u channels 87 crossover.

Figure 8:
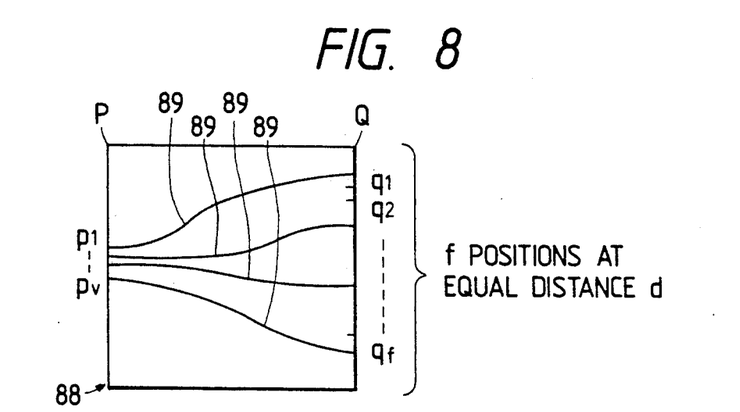
FIG. 8 is a diagram showing the pattern of grooves formed on a substrate for $S_B(k)$.

Similarly, as shown in FIG. 8, a substrate 88 for the subset $S_B(k)$ of terminals $b_j$ is provided with positions $p_1, \ldots, p_v$. The number of positions p is equal to the number of elements in subset $S_B(k)$. Positions $q_1, \ldots, q_f$ are spaced equal distances d on the opposite side Q, and are equal in number to the elements in subset $S_A(h)$. Between the positions $p_1, \ldots, p_v$ and corresponding positions $q_1, \ldots, q_i$, substrate 88 is spanned by grooves or channels 89 that form smooth curves. and which are used for mounting optical fibers. Positions $p_1, \ldots, p_v$ correspond to terminals $b_j$ of subset $S_B(k)$ in the increasing order of j, with position $p_j$ corresponding to terminal $b_j$. Accordingly, none of the v channels 89 crossover.

Figure 9:
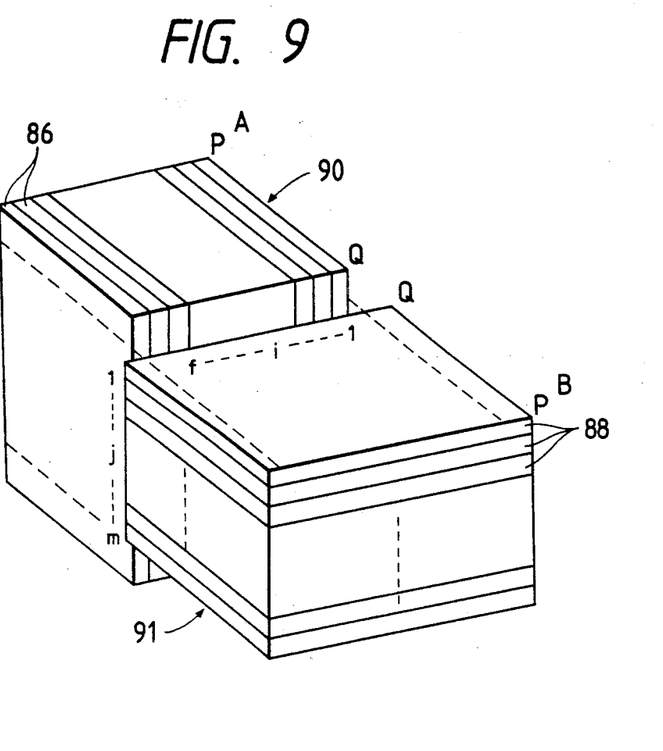
FIG. 9 shows the layout of a stack of substrates for $S_A(h)$ and a stack of substrates for $S_B(k)$.

As shown in FIG. 9, a plurality of substrates 86 for subset $S_A(h)$ are superposed one on top of another at equal distances d to form a stack 90 of substrates 86 for subset $S_A(h)$. On the other hand, a plurality of substrates 88 for subset $S_B(k)$ are superposed one on top of another at equal distances d to form a stack 91 of substrates 88 for subset $S_B(k)$. The side Q of each substrate 86 for $S_A(h)$ oppose the side Q of each substrate 88 for $S_B(k)$, and the stacking direction of stack 90 is perpendicular to the stacking direction of stack 91.

Figure 10:
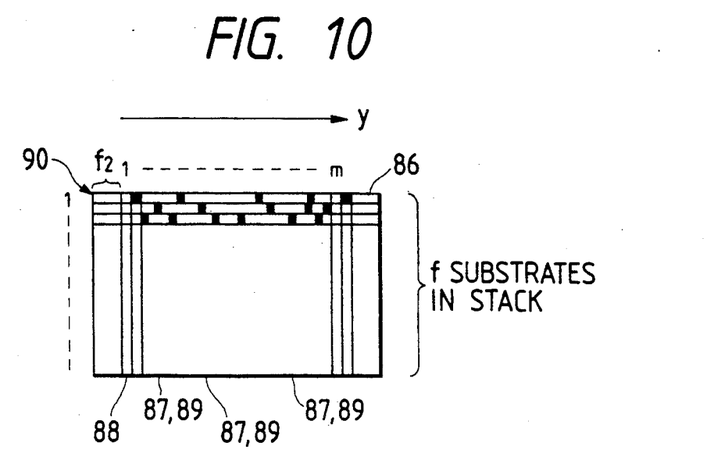

FIG. 10 shows a two-dimensional matrix formed by positions $q_i$ of the sides Q of stacks 90 and 91 when viewed looking into the area where side Q of each substrate 86 for $S_A(h)$ in stack 90 faces side Q of each substrate 88 for $S_B(k)$ in stack 91. (Note that FIG. 10 is rotated 90° from the perspective shown in FIG. 9 such that substrates 86 are layered horizontally and substrates 88 are layered vertically.) Wired channels 87 and 89, which are provided in substrates 86 for subset $S_A(h)$ and substrates 88 for subset $S_B(k)$, respectively, fix optical fibers that connect terminals $a_i$ to terminals $b_j$.

Positions $q_1, \ldots, q_m$, which start at a distance $f_2$ away from one end of a substrate 86, are provided in f horizontally layered substrates 86 for $S_A(h)$. Positions $q_1, \ldots, q_m$ are arranged such that columns of each respective position $q_i$ are formed when substrates 86 are stacked together, thereby forming an $f \times m$ matrix. Similarly, positions $q_1, \ldots, q_f$ are provided in m vertically layered substrates 88 for $S_B(k)$ and positions $q_1, \ldots, q_i$ are arranged such that rows of each respective position are formed when substrates 88 are stacked together, thereby forming another $f \times m$ matrix. If m positions $q_1, \ldots, q_m$ of substrate 86 for $S_A(h)$ equals m substrates 88 for $S_B(k)$ (i.e. $k=f$ to m), and if position $q_1$ of substrate 86 for $S_A(1)$ is aligned with position $q_1$ of substrate 88 for $S_B(1)$, the position of the component (i,j) in the matrix formed by substrates 86 for $S_A(h)$ will correspond with the position of the component (i,j) in the matrix formed by substrates 88 for $S_B(k)$. Accordingly, the substrates are not connected by cluttered optical fibers.

Figure 10A:
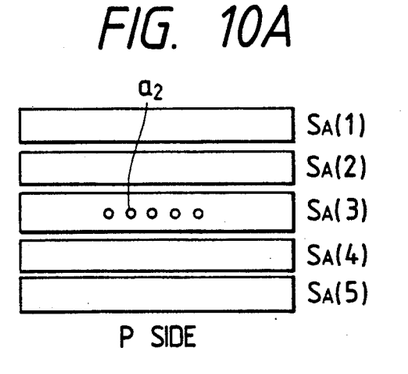
FIGS. 10A-10F illustrate a detailed example according to the present invention.
Figure 10B:
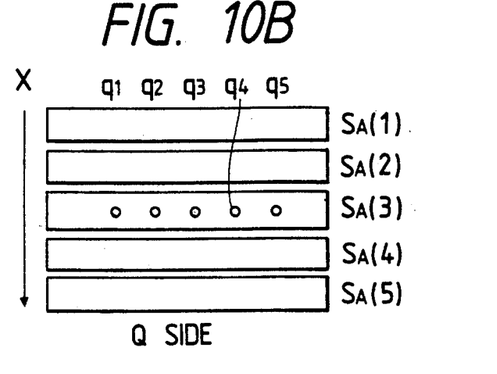
Figure 10C:
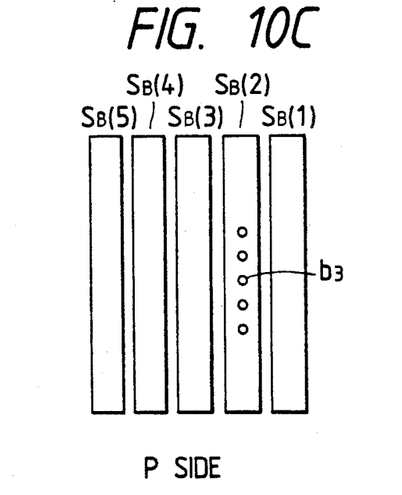
Figure 10D:
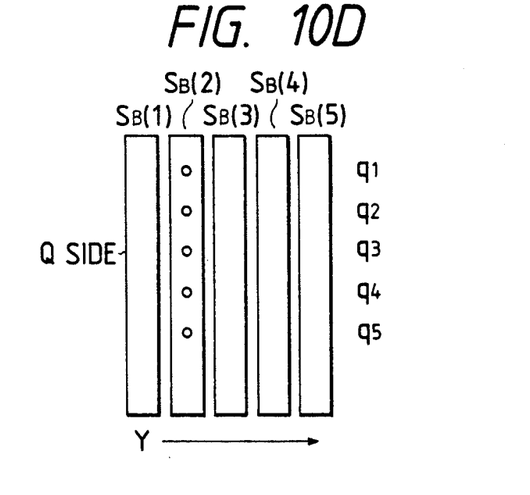
Figure 10E:
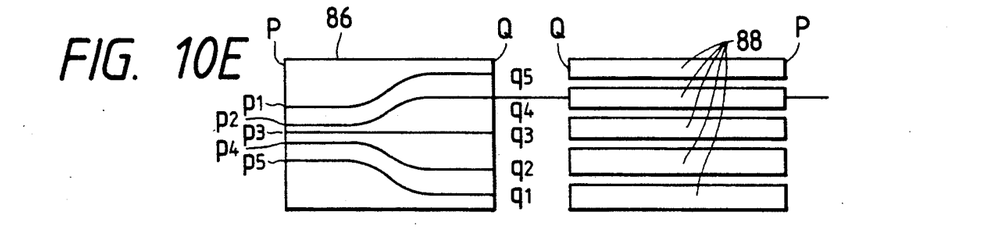
Figure 10F:
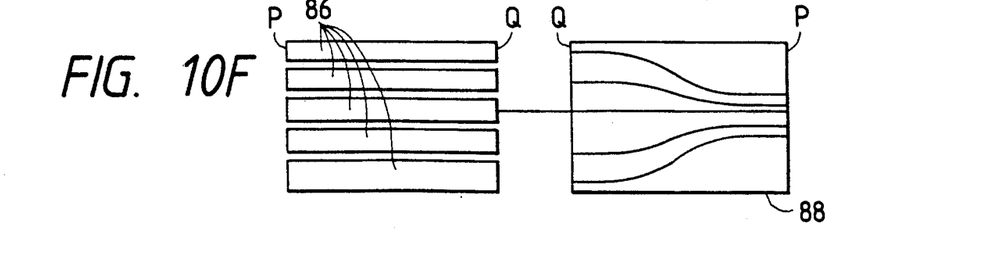

By way of illustration, FIGS. 10A-10F show a detailed example, where FIGS. 10A and 10B show the P side and the Q side, respectively, of substrates 86 for subsets $S_A(h)$ (h=1 to 5); FIGS. 10C and 10D show the P side and the Q side, respectively, of substrates 88 for subsets $S_B(k)$ (k=1 to 5); and FIGS. 10E and 10F show the connections between the two stacks of substrates 86 and 88.

According to this example, terminal $a_2$, which is the second element in a substrate 86 for subset $S_A(3)$, is connected to a corresponding terminal $b_3$, which is the third element in a substrate 88 for subset $S_B(2)$. The substrate 86 for $S_A(3)$, which is positioned at x=3 where x denotes the position of substrates 86 for $S_A(h)$ in the stacking direction, has five channels 87 which start at positions $p_1$-$p_5$ and correspond to terminals $a_i \in S_A(3)$. A channel 87 spans substrate 86 for $S_A(3)$ from position $p_2$ to position $q_4$. Position $q_4$ corresponds to coordinate (3,4) in the matrix formed by five substrates 86 for $S_A(h)$ and five positions $q_1$-$q_5$.

The substrate 88 for $S_B(2)$, which is positioned at y=2 where y denotes the position of substrates 88 for $S_B(k)$ in the stacking direction, has five channels 89 which start at positions $p_1$-$p_5$ and correspond to terminal $b_j \in S_B(2)$. The channel 89 spans substrate 88 for $S_B(2)$ from position $p_3$ to position $q_3$. Position $q_3$ coincides with the coordinate (3,2) in the matrix formed by the five positions $q_1$-$q_5$ and the five substrates 88 for $S_B(k)$. Accordingly, terminal $a_2$ can be connected to terminal $b_3$ by a single optical fiber that forms a straight line parallel to the planes of substrates 86 and 88 and which does not crossover.

Therefore, an optical fiber wiring apparatus may be provided in which none of the optical fibers crossover, or clutter, when the following conditions are met:

[1] $S_A(h_1) \cap S_A(h_2) = \phi (h_1 \neq h_2)$, $A = S_A(f) \cup S_A(2) \cup \cdots \cup S_A(1)$  $S_B(k_1) \cap S_B(k_2) = \phi(k_1 \neq k_2)$, $B = S_B(1) \cup S_B(2) \cup \cdots \cup S_B(m)$, where A has $f$ subsets $S_A(h)$ ($h = 1, \ldots, f$) and comprises a set of terminals $a_i$ ($i = 1, \ldots, n$) of one of any two optical elements to be connected by optical fibers, B has m subsets $S_B(k)$ ($k = 1, \ldots, m$) and comprises a set of terminals $b_j$ ($j = 1, \ldots, n$) of the other optical element. Terminals $a_i$ and $b_j$ are connected in a one-to-one relationship, with the number of elements in each of $S_A(h)$ and $S_B(k)$ being at least two;

[2] $h_1$ is always smaller than $h_2$, if $a_s$ and $a_t$ correspond respectively to $\exists b_s$, $\exists b_t \in S_B(k)$ ($s' < t'$) and $a_s \in S_A(h_1)$ and $a_t \in S_A(h_2)$; and

[3] $k_1$ is always smaller than $k_2$, if $b_s$ and $b_t$ correspond respectively to $\exists a_s$, $\exists a_t \in S_A(b)$ ($s < t$) and $b_s \in S_B(k_1)$ and $b_t \in S_B(k_2)$).

Figure 11:
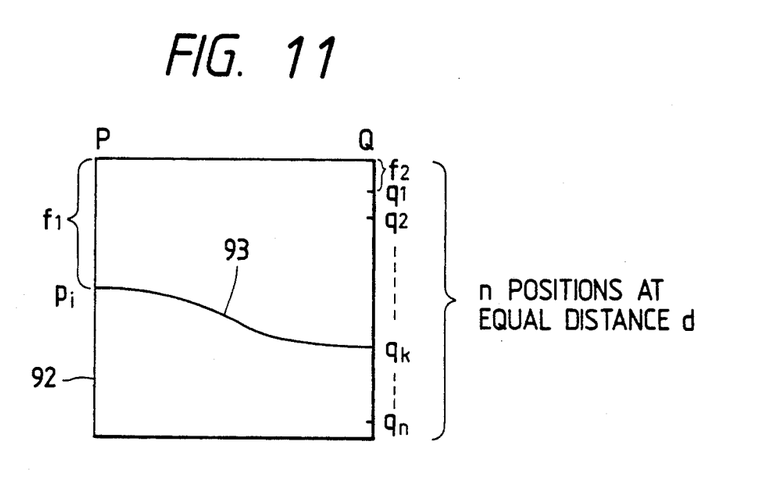
FIG. 11 is a diagram showing the pattern of grooves formed on a substrate for $S_A(h)$.

The same discussion will hold in the case where each of subsets $S_A(h)$ and $S_B(k)$ consists of one element and where there are n subsets $S_A(h)$, and n subsets $S_B(k)$. If terminals $a_i$ and $b_j$ are connected by optical fibers to satisfy the conditions f: $a_i \rightarrow b_j$ and $f^{-1}$: $b_j \rightarrow a_i$ as shown in FIG. 11, side P of substrate 92 for $S_A(h)$ is provided with only position $p_i$, which is connected by a smooth curve channel 93 to position $q_k$ which is one of the positions $q_1, \ldots, q_n$ that corresponds to $b_j S_B(k)$. The same is true with a substrate for $S_B(k)$ (not shown). Side P of this substrate is also provided with only position $p_l$ (not shown), which is connected by a smooth curved channel (now shown) to position $q_h$ (not shown) which is one of the positions $q_1, \ldots, q_n$ on side Q that corresponds to $a_i S_A(h)$. The n substrates 92 for $S_A(h)$ and the n substrates for $S_B(k)$ are respectively stacked in the way already described and are connected according to the layout described below.

Figure 12:
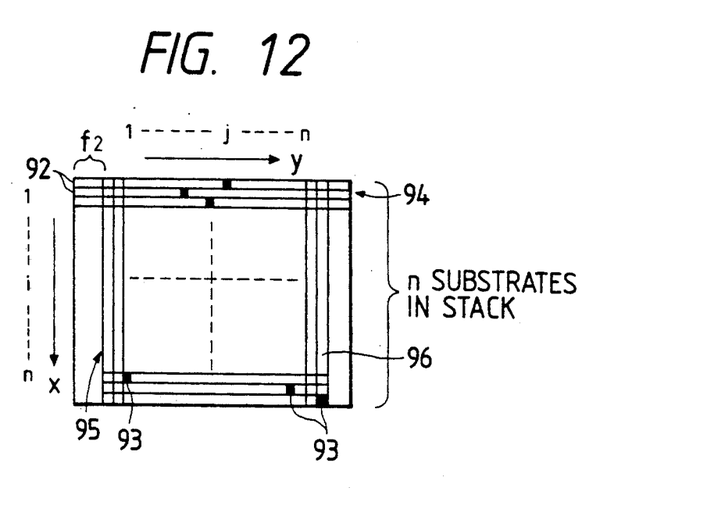
FIG. 12 illustrates how the side Q of substrates for $S_A(h)$ overlaps the side Q of substrates for $S_B(k)$.

As shown in FIG. 12, the overlap between side Q of the stack 94 of substrates 92 for $S_A(h)$ and side Q of the stack 95 of substrates 96 for $S_B(k)$ may be considered to form a matrix in the way previously described. Positions $q_1, \ldots, q_n$ start a distance $f_2$ away from the end of a substrate 92 for $S_A(h)$ and thus are columnar components of the matrix. On the other hand, positions $q_1, \ldots, q_n$ that are arranged in a direction perpendicular to the stacking direction of the substrates 92 for $S_A(h)$ are row components. Similarly, if substrates 96 for $S_B(k)$ are disposed in such a way that the side Q of each substrate 96 faces a single vertical line of n positions $q_k$ that are provided in the substrates 92 for $S_A(h)$ and which correspond to $S_B(k)$ and if position $q_1$ provided on side Q of substrate 92 for $S_A(1)$ is brought into alignment with position $q_1$ on side Q of substrate 96 for $S_B(1)$, positions $q_1, \ldots, q_n$ on side Q of n substrates 96 for $S_B(k)$ will correspond to the columnar components of the matrix formed by substrates 92 for $S_A(h)$, with positions $q_1$ on the substrates 92 and 96 corresponding to the individual components of the $n \times m$ matrix. Since substrates 92 and 96 are stacked at equal distances d, the positions of any two opposing channels in the substrates 92 and 96 are in alignment.

Further, each substrate is provided with only one channel that spans from position $p_i$ to position $q_i$ ($i = 1, \ldots, n$). Thus, the $n \times n$ matrix has only one channel in one column and only one channel in one row. As one can understand from the nature of the matrix described above, an optical fiber fixed on position (i,r) in the stack 94 of substrates 92 for $S_A(h)$ is connected to position (i,r) in the stack 95 of substrates 96 for $S_B(k)$.

2. Embodiments

Figure 1:
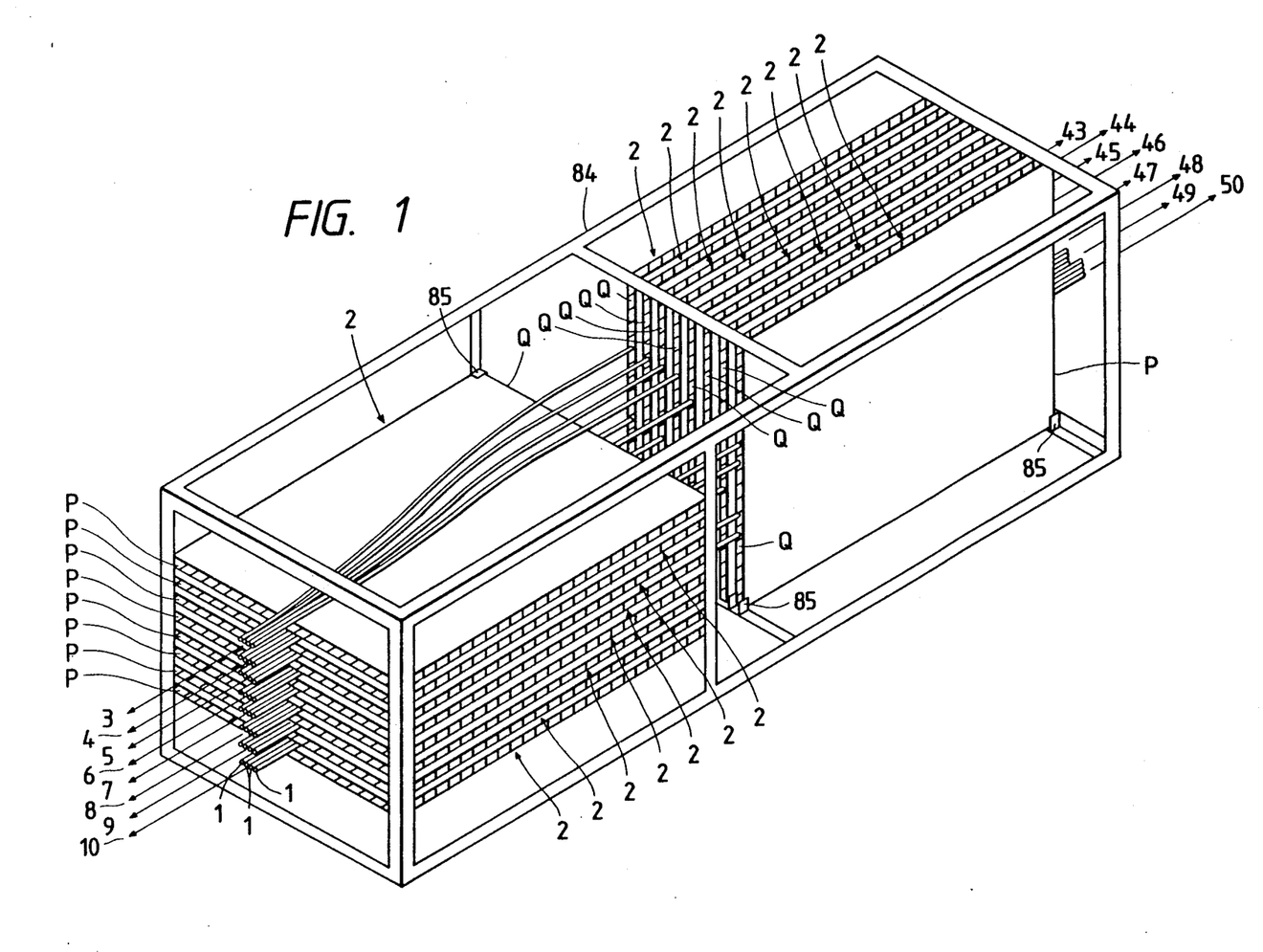
FIG. 1 is a perspective view of a first embodiment.
Figure 2:
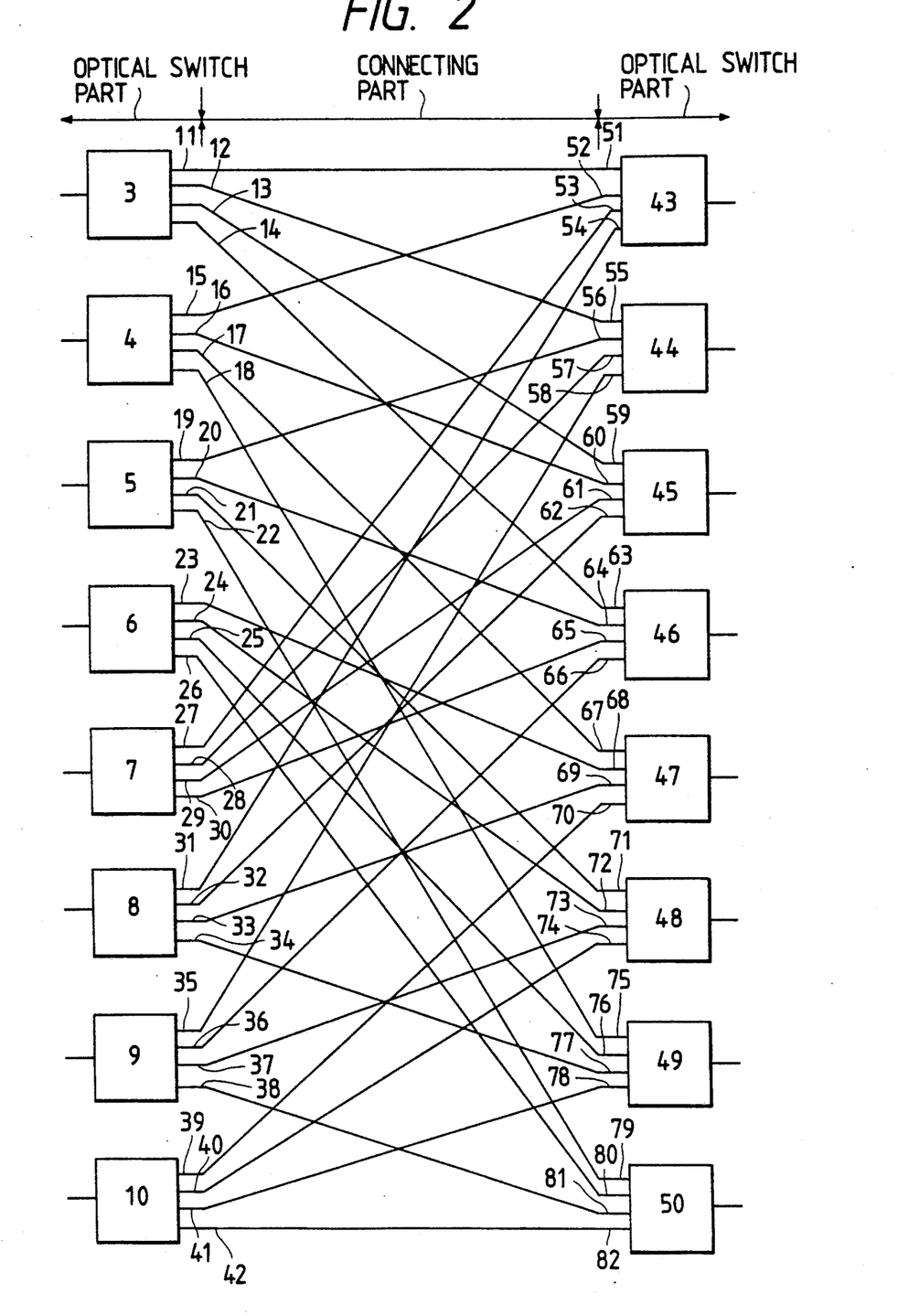
FIG. 2 is a diagram of optical switch connection.

Two preferred embodiments of the present invention are described hereinafter with reference to the accompanying drawings. FIG. 1 is a perspective view showing the construction of a first embodiment of the present invention. Single-mode optical fiber 1 carries light in a 1.3 μm band, has a core and a cladding diameter of 9 and 125 μm, respectively. Substrate 2 serves as a substrate to which optical fibers 1 are fixed. As also shown in FIG. 2, optical fibers 1 connect terminals 11, 12, ..., 42 of $1 \times 4$ terminal optical switches 3, 4, 5, 6, 7, 8, 9 and 10 to terminals 51, 52, ..., 82 of $4 \times 1$ terminal optical switches 43, 44, 45, 46, ..., 50.

If the set of terminals 11, ..., 42 of optical switches 3, ..., 10 is described as set A, then the subsets $S_A(1)$, $S_A(2)$, ..., $S_A(8)$ of terminals 11, 12, ..., 42 may be expressed as follows:
$S_A(1) = \{11, 12, 13, 14\}$,
$S_A(2) = \{15, 16, 17, 18\}, \ldots$,
$S_A(8) = \{39, 40, 41, 42\}$.

Similarly, if the set of terminals 51, 52, ..., 82 of optical switches 43, 44, ..., 50 is described as set B, then the subsets $S_B(1)$, $S_B(2)$, ..., $S_B(8)$ of terminals 51, 52, ..., 82 may be expressed as follows:
$S_B(1) = \{51, 52, 53, 54\}$,
$S_B(2) = \{55, 56, 57, 58\}, \ldots$,
$S_B(8) = \{79, 80, 81, 82\}$.

The subsets $S_A(1)$, $S_A(2)$, ... $S_A(8)$ and $S_B(1)$, $S_B(2)$, ... $S_B(8)$ satisfy the following conditions:
$S_A(h_1) \cap S_A(h_2) = \phi$, $h_1 \neq h_2$ ($h_1, h_2 = 1, \ldots, 8$)
$S_A(1) \cup S_A(2) \cup S_A(3) \cup \ldots \cup S_A(8) = A$
$S_B(k_1) \cap S_B(k_2) = \phi$, $k_1 \neq k_2$ ($k_1, k_2 = 1, \ldots, 8$)
$S_B(1) \cup S_B(2) \cup S_A(3) \ldots \cup S_B(8) = B$.

With the elements of each subset being arranged in the increasing order of i or j, there exists one-to-one mapping of terminals 11, 12, ... 42 and 51, 52, ..., 82 such that: $\exists c_i$, $\exists c_j \in S_A(h)$ ($c_i$, $c_j = 11, 12, \ldots, 42$; $h = 1, 2, \ldots, 8$, $i < j$). Accordingly, $k_1$ is always smaller than $k_2$ with respect to $e_i \in S_B(k_1)$ and $e_j \in S_B(k_2)$ where f: $c_i \rightarrow e_i$ and f: $c_j \rightarrow e_j$ hold.

There also exists one-to-one inverse mapping of terminals with respect to $\exists e_i$, $\exists e_j \in S_B(k)$ ($e_i$, $e_j = 51, 52, \ldots, 82$; $k = 1, 2; \ldots 8$, $i < j$). Accordingly, $h_1$ is always smaller than $h_2$ with respect to $c_i \in S_A(h_1)$ and $c_j \in S_A(h_2)$ where $f^{-1}$: $e_i \rightarrow c_i$ and $f^{-1}$: $e_j \rightarrow c_j$ hold.

In other words, f: $c_i \rightarrow e_i$ and f: $c_j \rightarrow e_j$ with respect to $\exists c_i \in S_A(h_1)$ and $\exists c_j \in S_A(h_2)$ ($h_1 < h_2$), and i is always smaller than j if $e_i$, $e_j \in S_B(k)$. Further, $f^{-1}$: $e_i \rightarrow c_i$ and $f^{-1}$: $e_j \rightarrow c_j$ with respect to $\exists e_i \in S_B(k_1)$ and $\exists e_j \in S_B(k_2)$ ($k_1 < k_2$), and i is always smaller than j if $c_i$, $c_j \in S_A(h)$.

Under the conditions set forth above, optical switches 3, 4, ..., 10 are connected to optical switches 43, ..., 50 with optical fibers 1.

Figure 3:
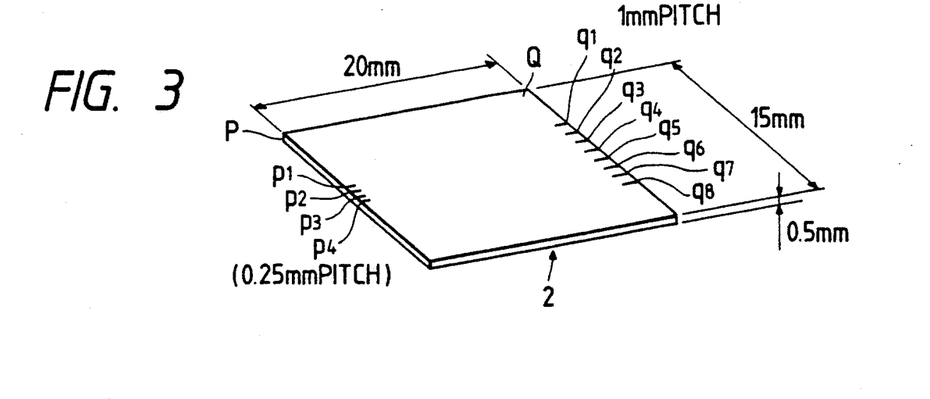
FIG. 3 is a perspective view of a substrate for $S_A(h)$.

FIG. 3 shows a substrate 2 of a size 15 mm × 20 mm × 0.5 mm (which has a metal evaporated onto the surface of a plastic sheet) which is provided for terminal subsets $S_A(h)$ ($h = 1, \ldots, 8$) and $S_B(k)$ ($k = 1, \ldots, 8$). Positions $p_1, p_2, p_3$ and $p_4$ are provided at a 0.25 mm pitch on one side P of the substrate 2. These positions $p_1, \ldots, p_4$ correspond to terminals 11, ..., 42 of $S_A(h)$ ($h = 1, \ldots, 8$) and optical fibers 1 to be connected to the corresponding terminals are fixed to these positions. Positions $q_1, q_2, \ldots, q_8$ are provided at a 1 mm pitch on the opposing side Q such that the positions correspond to elements of $S_B(k)$ in the order of $S_B(1)$, $S_B(2)$, ..., $S_B(8)$.

Figure 4:
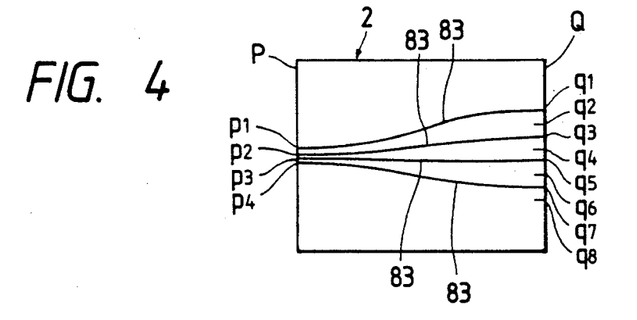
FIG. 4 is a diagram showing the pattern of grooves formed on the surface of a substrate for $S_A(h)$.

An example of the connections is described below, using terminal subset $S_A(2)$ of optical switch 4. As shown in FIG. 4, optical fibers 1, fixed to positions $p_1$, $p_2$, $p_3$ and $p_4$ are connected to terminals 15, 16, 17 and 18 of optical switch 4. As shown in FIG. 2, terminal 15 is connected to optical switch 43, terminal 16 to optical switch 45, terminal 17 to optical switch 47, and terminal 18 to optical switch 49. Hence, four grooves 83, each having a width of 250 μm Ad ???? a depth of 150 μm, are formed on the substrate in such a way that they describe smooth curves connecting positions $p_1$ and $q_1$, $p_2$ and $q_3$, $p_3$ and $q_5$, and $p_4$ and $q_7$. To insure long-term reliability of optical fibers 1, the radius of curvature of each groove 83 is adjusted to a value not smaller than 30 mm. As described above, none of the grooves 83 will cross one another. A similar substrate 2 is provided for each of the subsets $S_A(h)$ (h=1, ..., 8) of terminals 11, 12, ..., 42 of optical switches 3, 5, 6, 7, 8 9 and 10.

A substrate 2 is also provided for each of the subsets $S_B(k)$ (k=1, ..., 8) of terminals 51, ..., 82 of optical switches 43, 44, ..., 50. Positions $p_1, ..., p_4$ correspond to elements $b_j$ of subset $S_B(k)$ in the increasing order of j.

As shown in FIG. 1, optical fibers 1 are inserted into grooves 83 on the substrate 2 for $S_A(1), ..., S_A(8)$. A plurality of such substrates 2 are stacked in order of optical switches 3-10 with the stack positions determined by pawls 85 on a frame 84 such that the stacking pitch is 1 mm. This pitch is equal to the interval at which positions $q_1, q_2, q_3, ..., q_8$ are spaced. The stacked substrates 2 are fixed in such a way that side Q will face optical switches 43-50.

Figure 5:
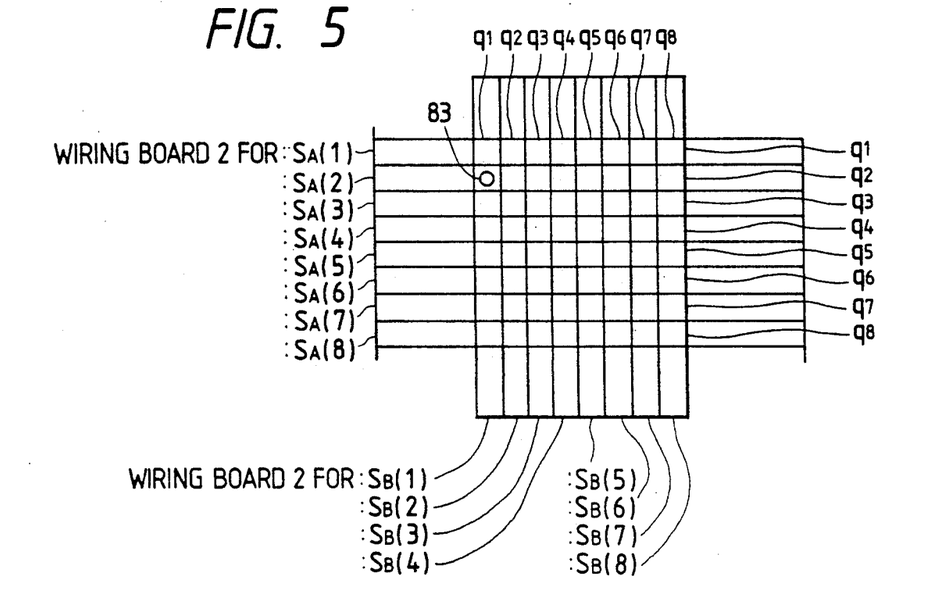
FIGS. 5 and 10 illustrate how the side Q of substrates for $S_A(h)$ overlap the side Q of substrates for $S_B(k)$.

Subsequently, substrates 2 for subsets $S_B(1), S_B(2), ..., S_B(8)$ are stacked in a direction perpendicular to the stacking direction of substrates 2 for subsets $S_A(1), S_A(2), ..., S_A(8)$ such that side Q of substrates 2 for $S_B(k)$ (k=1, ..., 8) will face the stack substrates 2 for $S_A(h)$ (h=1, ..., 8) at a distance of 8 mm. Substrate 2 for subset $S_B(1)$ (i.e. the substrate corresponding to optical switch 43) corresponds to a column of all eight positions $q_1, q_1, q_1, ..., q_1$ on side Q of the eight substrates 2 in the first stack of subsets $S_A(h)$. Similarly, the substrate 2 for subset $S_A(1)$ corresponds to the row of eight positions $q_1, q_1, q_1, ..., q_1$ on side Q of the eight substrates 2 in the second stack of subsets $S_B(k)$. In this stacking operation, pawls 85 on the frame 84 are used as aligning means and thereafter, optical fibers 1 are inserted into grooves 83 and fixed therein. FIG. 5 shows an 8×8 matrix formed by positions $q_1, q_2, ..., q_8$ on the substrates 2 for $S_A(h)$ and positions $q_1, q_2, ..., q_8$ on the substrates 2 for $S_B(k)$ when the side Q of each substrate 2 for $S_A(h)$ was superposed on the side Q of each substrate 2 for $S_B(k)$,.

Eight positions $q_1, ..., q_8$ on the substrate 2 for each subset $S_A(h)$ are arranged such that when the eight subsets $S_A(1)-S_A(8)$ are stacked together, the positions $q_1-q_8$ form a vertical column. Similarly, eight positions $q_1, ..., q_8$ on the substrate 2 for each subset $S_B(k)$ are arranged such that when the eight subsets $S_B(1)-S_B(8)$ are stacked together, the positions $q_1-q_8$ form a horizontal column. Thus, the groove 83, to which the optical fiber 1 that connects terminals 15 and 52 is fixed, is in the second row and first column of the 8×8 matrix.

The optical fiber 1 fixed in the groove 83 at position $q_1$ on the substrate 2 for $S_A(2)$ is also fixed in the groove 83 at position $q_2$ of the substrate 2 for $S_B(1)$. Groove 83 has a position on the matrix expressed by coordinate (2,1), with position $q_1$ on the substrate 2 for $S_A(2)$ coinciding with the position $q_2$ on the substrate 2 for $S_B(1)$. Hence, the optical fiber between the two substrates 2 forms a straight line.

In the next step, the four optical fibers 1 extending from positions $p_1, p_2, p_3$ and $p_4$ on each substrate 2 are aligned, producing a wiring apparatus whose overall size is 20×20×53 mm.

According to the present invention, the optical fibers 1 connect the terminals 11, 12, ..., 42 of optical switches 3, 4, 5, ..., 10 to the terminals 51, 52, ..., 82 of optical switches 43, ..., 50 via substrates 2 without forming any crossovers. When 32 single-mode optical fibers are used in the apparatus described above, none suffer a transmission loss greater than 0.01 dB (1.3 μm), whereas conventional devices, due to crossover, generally suffer a transmission loss greater than 0.2 dB.

According to a second embodiment of the present invention, each of the optical switches 3-10 and 43-50 is of a 1×1 terminal type. Thus, each subset $S_A(1)-S_A(8)$ and $S_B(1)-S_B(8)$ has only one element, and only one position p is provided on side P of each substrate 2. Except for these differences, the second embodiment, including the fabrication of the stack of substrates 2 for $S_A(h)$ and the stack of substrates 2 for $S_B(k)$, and the layout of the two stacks, is identical to the first embodiment. Only one optical fiber 1 is fixed in each substrate 2, and hence will not form any crossovers.

The matrix interconnects between substrates 2 is also the same as shown in FIG. 5. For example, when optical switch 4 is to be connected to optical switch 43 by an optical fiber, the position of the optical fiber on the matrix is also expressed by coordinate (2,1), and the groove on the substrate for $S_A(h)$ coincides in position with the groove on the substrate for $S_B(k)$.

Accordingly, the optical fibers 1 are capable of connecting optical switches 3, ..., 10 to optical switches 43, ..., 50 without forming any crossovers.

As shown in the two embodiments of the present invention, optical fibers are routed in grooves on substrates which enables the fibers to be fixed without cluttering or causing any sharp bends, thereby realizing a structure that is free from crossovers of fibers on the substrates. Furthermore, as one can see by comparing the first and second embodiments, the invention recited in the second embodiment has the advantage over the invention of the first embodiment in that the matrix formed by the opposing sides of two stacks of substrates can be reduced by a factor of $m/n^2$, thus realizing a much smaller apparatus.

In the present invention, the set of terminals $a_i$ and the set of terminals $b_j$ are each divided into a plurality of subsets under the conditions set forth herein. However, this is not intended to dictate a special case. For example, consider the case where M optical switches of N×N terminal type are arranged on one side and M optical switches of the same terminal type are arranged on the other side. These optical switches are connected by links to construct a large-scale switch assembly having MN×MN terminals. Subsets $S_A(h)$ of the output terminals of N×N type switches on one side and subsets $S_B(k)$ of the input terminals of N×N type switches on the other side can easily be connected in such a way as to satisfy the conditions described herein with respect to $S_A(1), S_A(2), ..., S_A(M)$ and $S_B(1), S_B(2), ..., S_B(M)$.

The grooves to be formed in the surface of substrates are not limited to any particular shape, but are preferably smooth in the longitudinal direction and the curvature is as small as possible to the extent that the reliability of fiber strength will not be impaired. To give a specific example, an optical fiber having a cladding diameter of 125 μm is preferably routed in a groove having a curvature no more than 0.05 mm$^{-1}$.

The grooves may have any cross-sectional shape such as a "U", "V" or rectangular form as long as the groove has a recess large enough to accommodate either part or all of the fiber cross section. The width and depth of the grooves also are not limited to any particular values as long as the width is smaller than each distance between adjacent positions $p_i$ and $p_{i+1}$ and each distance between adjacent positions $q_i$ and $q_{i+1}$, and the depth is smaller than the thickness of each substrate.

The placement of positions $p_i$ on side P of a substrate is not limited and need not be spaced at equal intervals or pitches. These positions $p_i$ may be provided in a completely identical manner on all the substrates to be stacked. If desired, positions $p_i$ on one substrate may be staggered from positions $p_i$ on an adjacent substrate although the pitch between adjacent positions $p_i$ is the same for the two substrates. Note, however, that if the pitch between adjacent positions $p_i$ is made equal to the outside diameter of a fiber, the fibers used can be aligned in tape or ribbon form.

Optical fibers may be fixed in grooves by various methods, such as routing the fibers in the grooves and fixing them with an adhesive, or placing the fibers in the grooves and putting covers thereon. In view of operating efficiency, the adhesive is poured preferably into the grooves before optical fibers are routed therein.

When the stack of substrates for $S_A(h)$ and the stack of substrates $S_B(k)$ are placed facing each other at side Q, the clearance is approximately 5.5 d to 50 mm, where d is the pitch at which positions $q_1, \ldots, q_n$ are spaced or at which the substrates are superposed one on top of another. If the clearance is smaller than 5.5 d mm, optical fibers can be bent by a radius of curvature smaller than 30 mm when the positions of grooves are adjusted to absorb any variations within ±0.5 d mm that occur in the position of grooves or substrates in the cross section of each stack, and this may bring the reliability of optical fibers into question. If the clearance is greater than 50 mm, the optical fibers between the stacks tend to sage under their own weight to cause bends. Further, the apparatus itself will become unduly bulky. Needless to say, the clearance between the two stacks could be adjusted in a more flexible way if the precision of machining or flexural rigidity of optical fibers was further improved.

The optical fibers used to interconnect optical elements may be two or more fibers either connected or spliced to form a single fiber.

It is to be understood that the invention is not limited to the disclosed embodiment, but is intended to cover various modifications and equivalent arrangements included within the spirit and scope of the appended claims.

I claim:

1. An optical fiber wiring apparatus comprising:
a plurality of first substrates stacked in a first direction, each said first substrate having grooves formed therein;
a plurality of second substrates stacked in a second direction, each said second substrate having grooves formed therein; and
at least one optical fiber being fixed in at least one of the grooves on each of said plurality of first and second substrates;
wherein said at least one optical fiber is fixed in one of the grooves formed in one of said first substrates and is fixed also in one of the grooves formed in one of said second substrates;
wherein said plurality of first substrates and said plurality of second substrates are positioned such that none of said optical fibers cross over any other of said optical fiber.

2. An apparatus according to claim 1, wherein the grooves formed on each of said first and second substrates form a curvature such that the grooves are spaced apart by a first distance on a first end of each of said first and second substrates and the grooves are spaced apart by a second distance on a second end of each of said first and second substrates, and the first distance is smaller than the second distance.

3. An apparatus according to claim 1, wherein said first direction is perpendicular to said second direction.

4. An apparatus according to claim 2, further comprising a frame for holding said plurality of first substrates and said plurality of second substrates, wherein said first substrates are spaced at a third distance from each other, said second substrates are spaced at the third distance from each other, and said plurality of first substrates are separated by a fourth distance from said plurality of second substrates.

5. An apparatus according to claim 4, wherein in the third distance is approximately equal to the second distance.

6. An apparatus according to claim 1, wherein the following conditions are met:

[1] $S_A(h_1) \cap S_A(h_2) = \phi (h_1 \neq h_2)$, $A = S_A(1) \cup S_A(2) \cup \ldots \cup S_A(f)$ $S_B(k_1) \cap S_B(k_2) = \phi(k_1 \neq k_2)$, $B = S_B(1) \cup S_B(2) \cup \cdots \cup S_B(m)$, wherein $\cap$ represents intersection, U represents union, $\phi$ represents the null set, substrate set A represents said plurality of first substrates which contains f substrates represented as subsets $S_A(h)$ (h=1, ..., f), substrate set B represents said plurality of second substrates which contains m substrates represented as subsets $S_B(k)$ (k=1, ..., m), said substrate set A comprises a first set of terminals $a_i$ (i=1, ..., n) of one of any two optical elements to be connected by said optical fibers, said substrate set B comprises a second set of terminals $b_j$ (j=1, ..., n) of the other of the two optical elements, and the terminals $a_i$ and $b_j$ are connected in a one-to-one relationship, there being at least two optical elements in each of said subsets $S_A(h)$ and $S_B(k)$;

[2] $h_1$ is always smaller than $h_2$, if $a_s$ and $a_t$ correspond respectively to $\exists b_s$, $\exists b_t$, $\epsilon S_B(k)$ (s' < t') and $a_s \epsilon S_A(h_1)$ and $a_t S_A(h_2)$, where $\exists b_s$, $\exists b_t$ are elements of subset $S_B(k)$; and

[3] $k_1$ is always smaller than $k_2$, if $b_s$ and $b_t$ correspond respectively to $\exists a_s$, $\exists a_t$ $\epsilon S_A(b)$ (s < t) and $b_s \epsilon S_B(k_1)$ and $b_t \epsilon S_B(k_2)$, where $\exists a_s$, $\exists a_t$ are elements of subset $S_A(b)$.

* * * * *